Nov. 14, 1967  G. G. MOORE  3,352,433
POLE SETTING APPARATUS
Filed June 6, 1966  2 Sheets-Sheet 1
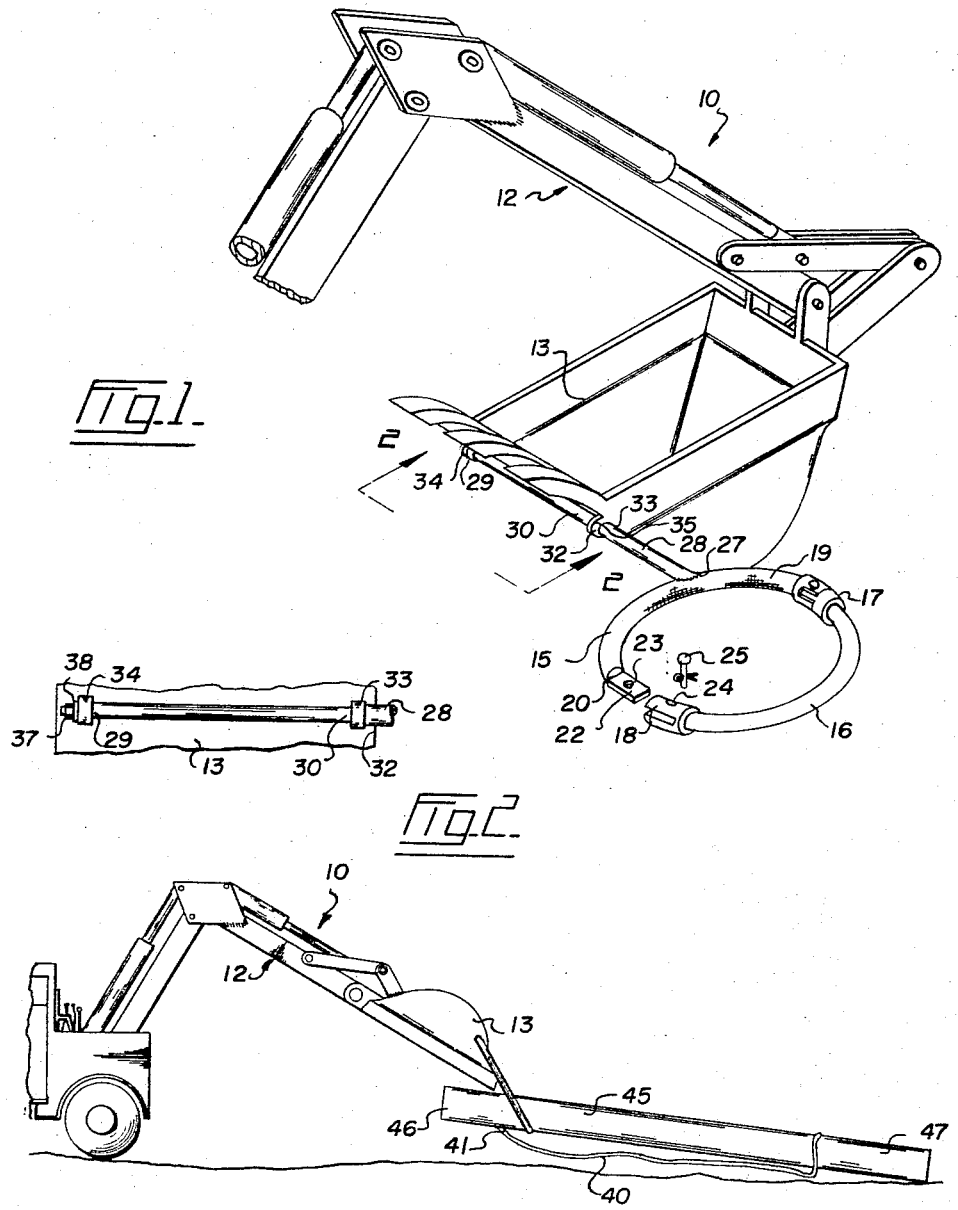
INVENTOR
GORDON G. MOORE
BY
Fetherstonhaugh & Co.
ATTORNEYS 3,352,433
POLE SETTING APPARATUS
Gordon G. Moore, 1176 Glendale Drive, Williams Lake, British Columbia, Canada
Filed June 6, 1966, Ser. No. 555,325
3 Claims. (Cl. 214—3)

ABSTRACT OF THE DISCLOSURE

Pole setting apparatus having a loop member rotatably connectable to a work unit at the end of a powered vertically movable boom for slidably embracing a pole to be set above the centre of gravity thereof, and a cable extending between the butt end of the pole and the loop for raising the pole when the boom is raised.

---

Figure 4:
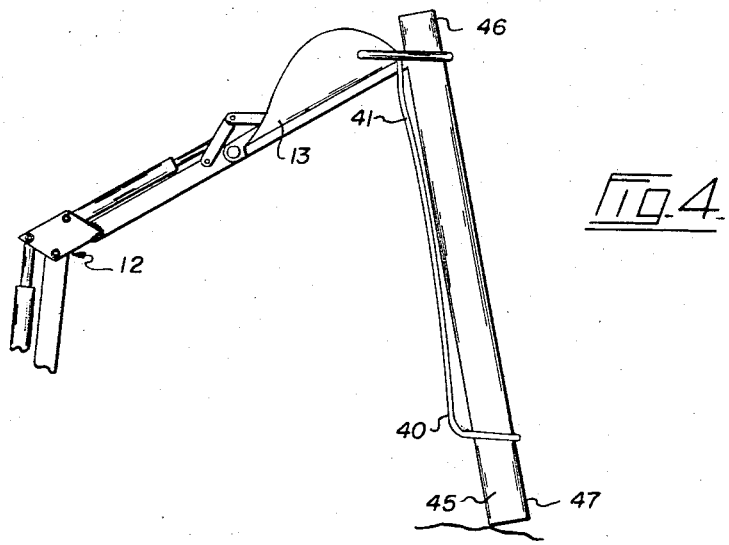

This invention relates to apparatus for setting poles such as power and telephone poles.

In power and telephone line direction, the setting of the wire carrying poles quite often presents serious difficulties. Where the poles, such as in power lines are very long and heavy, it will be appreciated that mechanized equipment must be employed and, in this respect, trucks equipped with gin poles are sometimes used and quite often equipment having extensible or movable booms to which the pole may be secured are also employed. This is not very satisfactory as it is often quite difficult to get trucks and the like into the proper position and where the poles are tied or secured to the booms of boomed equipment, it sometimes proves difficult to detach the pole and the boom as the pole must necessarily be supported at a point above its centre of gravity where it is raised to a vertical position.

The present invention provides an apparatus which may be detachably secured to boomed equipment which is ordinarily used for puropses, such as digging, during the construction of the line, and which may be easily applied to a pole to lift the latter above the surface of the ground in a vertical position and to lower the pole into a hole prepared for it and afterwards detached with relative ease.

The present invention provides an apparatus which may be easily detached from the boom equipment to permit the latter to be used for other purposes when needed.

The present invention comprises a loop member formed of a pair of hingedly interconnected semi-circular parts swingable relative to each other between loop closed and loop open positions and being adapted when in said closed position to slidably embrace a pole to be set, means for releasably locking said parts in said loop closed position, an elongated shaft rigidly connected at one end to one of the parts, said shaft extending in the plane of the loop formed when the parts are arranged in a loop closed position, means at the free end of the boom for rotatably and slidably receiving the shaft, said means being arranged so that the shaft extends in a horizontal position transversely of the longitudinal axis of the boom, a cable for connecting the shaft and the pole for lifting the latter when the boom is swung upwardly.

Figure 5:
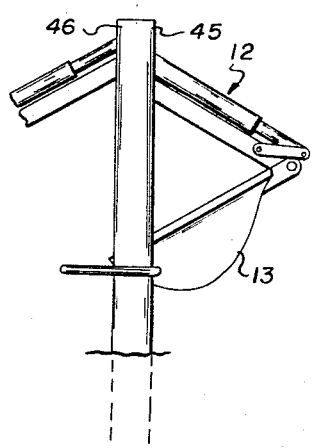

In the drawings which illustrate the invention,

FIGURE 1 is an isometric view of a portion of a back hoe showing the apparatus in position, FIGURE 2 is a front view of a portion of the apparatus in the direction 2—2 of FIGURE 1, FIGURE 3 is a side view of a back hoe with the apparatus there attached at the commencement of a pole setting operation, FIGURE 4 is a side view similar to FIGURE 3 of a portion of the back hoe illustrating the pole in a vertical position prior to being lowered into a hole prepared therefor, and FIGURE 5 is another side view similar to FIGURES 3 and 4 of a portion of a back hoe and the apparatus illustrating the latter in position to be detached from the pole.

Referring to the drawings and particularly to FIGURES 1, 2 and 3 thereof, the apparatus indicated generally by the numeral 10 is illustrated in associated use with a back hoe 11 having an articulated boom 12, the latter having a carrying bucket or other similar working unit 13.

The pole setting apparatus 10 comprises a pair of semi-circular loop elements 15 and 16 respectively which may be formed of strong steel rod, loop element 16 having ends 17 and 18, and loop element 15 having ends 19 and 20. The loop elements are hingedly interconnected at their ends 17 and 19 so as to permit their ends 18 and 20 to be swung towards and away from each other. End 18 of loop element 16 is bifurcated and end 20 of loop element 15 has a flattened portion 22 adapted, when the elements are swung together, to form a closed loop to slidably engage the bifurcated end 18 of loop element 16. Both the bifurcated end 18 of loop element 15 and the flattened portion 22 are provided with transversely formed holes 23 and 24 respectively which may be brought into registry when the loop elements are formed into a single circular loop, said holes slidably receiving a locking pin 25.

To loop element 15 is welded or otherwise fastened, one end 27 of an elongated cylindrical shaft 28, said shaft extending parallel to the plane of the loop formed by said loop elements.

The shaft from its other end 29 to approximately its mid point is reduced in diameter forming an elongated cylindrical end portion 30 terminating in a shoulder 32.

To the bucket 13 of the back hoe just beneath the teeth of the latter are welded in spaced apart relationship, a pair of bracket members 33 and 34, each of them having a hole 35 formed therethrough and arranged to slidably and rotatably receive the reduced end portion 30 of the shaft. The shaft 28 is positioned with the shoulder 32 against bracket member 33, the length of said end portion 30 and the spacing of the bracket members 33 and 34 being such that the end 29 of the shaft exends outwardly beyond bracket member 34, the shaft being secured against longitudinal movement relative to the brackets by a nut 37 threaded over said end 29 so as to bear against a washer 38 inserted between said nut and said bracket 34.

The apparatus 10 is also provided with a length of cable 40 which has a loop formed at one end 41 through which the shaft 28 is extended and secured in.

It will be appreciated that the provision of the bracket members 33 and 34 may at times, with certain types of buckets, interfere with digging operations. In order to overcome this problem, holes may be formed through the side walls of the bucket through which the portion 30 of the shaft may be extended and secured.

FIGURES 3 to 5 illustrate the use of the apparatus to set a pole 45 having an upper end 46 and a lower end 47. The loop elements 15 and 16 are arranged in the form of a loop and secured by means of the locking pin 25. The loop thus formed is slipped over the upper end 46 of the pole, and the cable looped around and tied to the pole below the centre of gravity of the latter. This is shown in FIGURE 3.

The boom 12 of the back hoe is then elevated to lift the pole 45 to a vertical position as illustrated in FIGURE 4. Upon further elevation of the boom, the cable will tighten and lift the lower end 47 of the pole above the surface of the ground. As the cable is secured to the pole below the centre of gravity of the latter, the pole will of course always assume a vertical position. The boom 12 of the back hoe may then be maneuvered to position the lower end 47 of the pole over the hole 48 and therein lowered. The pole of course may be maintained in a suitable vertical position until workmen have poured and tamped earth between the walls of the pole and the hole. The boom 12 may then be lowered to bring the looped elements 15 and 16 down to a height above the ground where it may be disengaged from the pole by simply pulling the locking pin 25 and swinging the loop element 16 away from the pole. The cable then of course may be untied from the pole and the back hoe moved to another location.

What I claim as my invention is:

1. Pole setting apparatus for use with powered equipment having a vertically swingable boom said boom having a work unit fixed at its free end, said apparatus comprising a loop member formed of a pair of hingedly interconnected semi-circular parts swingable relative to each other between loop closed and loop open positions and being adapted when in said closed position to slidably embrace a pole to be set, means for releasably locking said parts in said loop closed position, an elongated shaft rigidly connected at one end to one of the parts, said shaft extending in the plane of the loop formed when the parts are arranged in a loop closed position, means connected to the work unit for rotatably and slidably receiving the shaft, said means being arranged so that the shaft extends in a horizontal position transversely of the longitudinal axis of the boom and a cable for connecting the shaft and the pole for lifting the latter when the boom is swung upwardly.

2. Pole setting apparatus as claimed in claim 1 wherein said last-mentioned means comprises a pair of bracket elements arranged in spaced apart transversely aligned relationship, said elements each having a hole formed therethrough adapted to rotatably receive the shaft.

3. Pole setting apparatus as claimed in claim 1 in which the length of the cable is such as to permit connection thereof to the pole near the butt end thereof, when the loop member is arranged above the centre of gravity of the pole.

References Cited

UNITED STATES PATENTS

| 2,249,907 | 7/1941  | Perkowski | 214—3 X |
| 3,112,830 | 12/1963 | Podlesak  | 214—3   |
| 3,292,320 | 12/1966 | Laharty   | 214—3 X |

FOREIGN PATENTS 693,367 9/1964 Canada.

HUGO O. SCHULZ, *Primary Examiner.*